Abbott, Harrison & Welch.
Saw Sharpener.

Nº 89,724.   Patented May 4, 1869.

Witnesses.
S. B. Kidder.
M. W. Frothingham.

Inventors.
E. L. Abbott
J. B. Harrison
W. P. Welch
By Their Attys.

E. L. ABBOTT, JAMISON H. HARRISON, AND W. P. WELCH, OF BOSTON, MASSACHUSETTS, ASSIGNORS TO E. L. ABBOTT; SAID ABBOTT ASSIGNS TO HIMSELF AND S. A. WOODS.

Letters Patent No. 89,724, dated May 4, 1869.

IMPROVEMENT IN MACHINE FOR GRINDING SAWS.

The Schedule referred to in these Letters Patent and making part of the same.

*To all whom it may concern:*

Be it known that we, E. L. ABBOTT, JAMISON H. HARRISON, and W. P. WELCH, all of Boston, in the county of Suffolk, and State of Massachusetts, have invented an Improved Machine for Grinding the Teeth of Saws; and we do hereby declare that the following, taken in connection with the drawings which accompany and form part of this specification, is a description of our invention sufficient to enable those skilled in the art to practise it.

This invention relates to an apparatus or a machine by which the teeth of saws can be made and are sharpened by the action on the saw of a rotary grinding-wheel, made of or surfaced with any suitable abrasive substance or compound, the apparatus being adapted more particularly to operating on circular saws, though capable of cutting and sharpening the teeth of reciprocating saws; and Our invention consists in the combinations and arrangements of the parts of the machine or apparatus, by which the grinding-wheel is made to operate properly on saws of any size within the limits of the capacity of the machine, so as to produce any desired number and size of uniform teeth, and to give them any desired angle, bevel, or pitch, and to make the cutting-edges or angles of the teeth alternately on each side of the saw.

Figure 1:
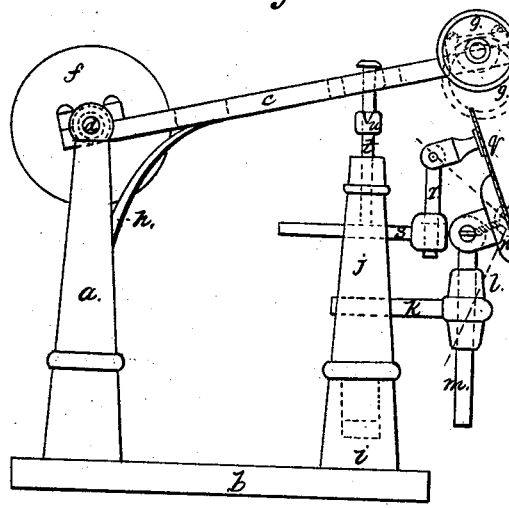
Figure 2:
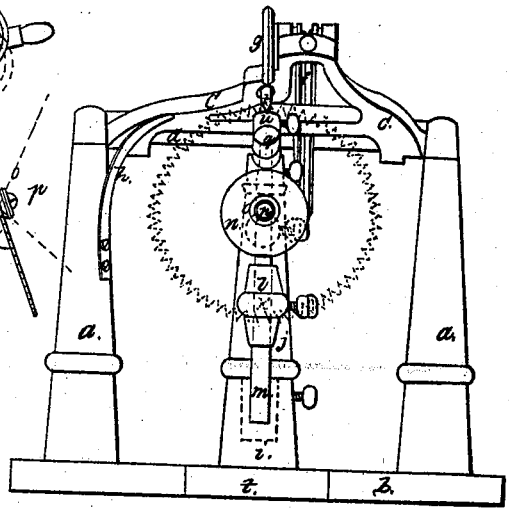
Figures 3, 4, 5:
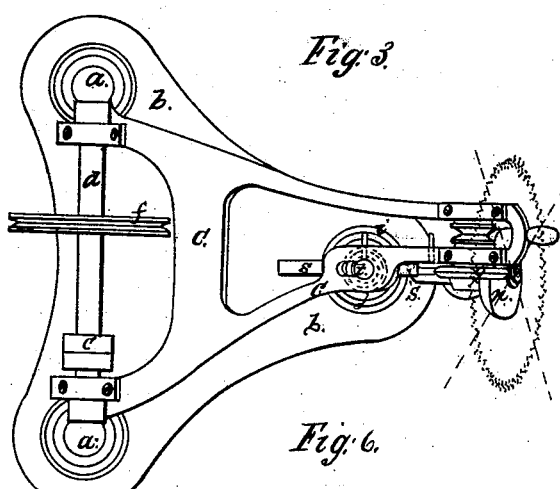

Figures 1, 2, and 3, are, respectively, side and front elevations, and a plan of our machine.

Pivoted on two standards, $a$, supported by the bed-plate, $b$, of the machine, is a swinging frame, $c$, having in suitable bearings, and in line with the frame-centres or pivots, a shaft, $d$, which receives motion from the pulley $e$, there being a loose fellow of the pulley $e$ on the shaft, and another pulley, $f$, which drives the grinder-arbor, mounted, in suitable bearings, in the opposite end of the frame $c$.

The grinding-wheel $g$ is attached to the end of the grinding-arbor, which overhangs the frame, by means similar to those employed for securing circular saws to their arbors, so that any grinding-wheel of suitable size and form may be easily mounted.

The frame is kept elevated by means of a spring, $h$, attached to one of the standards $a$, the spring bearing against the under side of the frame.

On the bed $b$, and in line with the grinding-wheel, is located the base, $i$, of a post, having, in its upper end, a socket, in which fits a pin or dowel of the upper part, $j$, of the post, to which upper part $j$ is connected the means for holding and presenting a circular saw to the action of the grinder $g$.

In $j$, a horizontal hole is bored, to receive the slide $k$, which has, at one end, a vertical socket, $l$, which receives the slide $m$, to the upper end of which is pivoted a face-plate, $n$, so that said plate can be made to assume a vertical position, or can be inclined therefrom in either direction.

To the face-plate $n$, circular saws are centred and clamped, by means of a cone, which enters the arbor-hole of the saw, the cone $o$ being drawn toward the face-plate by the action of a screw, $p$.

By the pivoting of the part $j$ in the part $i$ of the post, it will be seen that the saw may be made to assume any desired angle, as indicated by red lines in fig. 3, while, by the turning of the face-plate $n$ on its pivot, the saw may be made to assume any desired angle, as indicated by red lines in fig. 1.

By moving the slide $m$ toward and from the grinder $g$, saws of any diameter may be operated upon thereby.

All of the pivots, slides, and joints described, by which desired positions of the saw relative to the grinder $g$ are obtained, are provided with suitable set-screws or clamps, by which the parts are rigidly held.

To prevent troublesome vibration of the saw under the action of the grinder, a rest, $q$, is pivoted to the slide $r$, which is movable in a socket made in slide $s$, which is movable in the part $j$ of the post, by which arrangement of devices, it will be seen that the face of the rest $q$ can be adjusted for any size of saw, so as to bear against its side, and near to but not in contact with the grinder.

To regulate the depth to which the grinder will cut or dress the teeth of a saw, so that all of the teeth will be of uniform depth, a spindle, $t$, is placed in the upper end of the part $j$ of the post, and is made adjustable therein, by a set-screw, as to the amount of its projection, the spindle being provided with a head, and passing through a slot in the frame $c$, so that it will be seen that the head of the spindle may be set to prevent spring $h$ from lifting the grinder an unnecessary distance above the saw.

On the spindle $t$, and regulated and fixed in position by a set-screw, is a sliding collar, $u$, against which frame $c$ abuts, and limits the depth of the operation of the grinder, with reference to the centre of the saw, or the points of its teeth.

Figure 6:
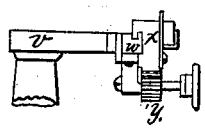

The top of part $j$ of the post is made cylindrical, to receive, when the circular-saw holder is turned to one side or the other, so as to be out of the way, an apparatus, for holding and presenting straight saws to the action of the grinder, said apparatus being shown in front view in Figure 4, in plan in Figure 5, and in end view in Figure 6.

On the cylindrical neck of $j$ is fitted a collar, $v$, to which a way, $w$, is pivoted, so that it may be adjusted and set to an inclination from perfect horizontality in the direction of its length.

On the way or slide-bar is arranged a carriage, $x$, which is made as a clamp, to receive and hold a straight saw, the carriage having, at its lower edge, a rack, into which meshes a pinion, $y$, arranged to turn in a bearing fixed to the way $w$.

It will be obvious that the edges of the grinders employed must be made to conform to the size and shape of the teeth to be made or to be sharpened, and also that, in some cases, different grinders may be used advantageously upon the same set of teeth; that is, one may be made to grind the faces, and another the backs of the teeth.

It will also be seen that, by the devices shown, the saw can be presented to the grinder at any angle necessary to produce any desirable bevels and forms of teeth needed for the most effective operation of saws on materials of different kinds.

With the machine, provided with suitable grinders, any person accustomed to file saws can perform the operation of sharpening them much more expeditiously and accurately than it can be done by filing, saving, also, materially in the cost of files.

The operation of gumming saw-plates, or of making teeth in plates not previously indented, can be performed in our machine, as well as the operation of grinding off formed teeth preliminary to forming new ones of different size, and an index-plate may be employed in connection with the circular saws to be operated upon, to insure accurate spacing of the teeth.

The lower part, $i$, of the post may be secured in a slot in the bed $b$, if desirable, to add to the distance to which the saw may be moved relatively to the grinder.

In figs. 2 and 3, the saw, shown in blue lines, is represented as transparent, to exhibit the parts beyond.

We claim a machine organized to form or sharpen saw-teeth by grinding, when constructed and arranged substantially as described, so that the saw can be clamped, mounted, and turned on its centre, to present its teeth, successively, to the action of the grinder, and so that, while said centre may be adjusted toward and from the grinder, to accommodate saws of various diameters, the angles of presentation of the flat surfaces of the saw may be universally varied.

Also, in combination with a machine as before claimed, a rest, $q$, arranged to be adjustable to any of the varied positions in which the saw is adjusted to receive the action of the grinding-wheel, substantially as and for the purpose specified.

Also, the combination of the swinging frame $c$, and its spring-support $h$, with the bolt $t$ and collar $u$, substantially as and for the purpose set forth.

E. L. ABBOTT.
   JAMISON H. HARRISON.
   W. P. WELCH.

Witnesses:
 J. B. CROSBY,
 C. WARREN BROWN.